US012562186B2

(12) United States Patent
Fujioka

(10) Patent No.: US 12,562,186 B2
(45) Date of Patent: Feb. 24, 2026

(54) RECORD PLAYER WITH ARM EXTENDED FROM FLOAT FOR PLAYING BACK HIGH-QUALITY STABLE SOUND

(71) Applicant: THINGS LLC, Tokyo (JP)

(72) Inventor: Sota Fujioka, Tokyo (JP)

(73) Assignee: THINGS LLC, Tokyo (JP)

( * ) Notice: Subject to any disclaimer, the term of this patent is extended or adjusted under 35 U.S.C. 154(b) by 0 days.

(21) Appl. No.: 18/996,997

(22) PCT Filed: Jul. 27, 2023

(86) PCT No.: PCT/JP2023/027647

§ 371 (c)(1),
(2) Date: Jan. 18, 2025

(87) PCT Pub. No.: WO2024/024907

PCT Pub. Date: Feb. 1, 2024

(65) Prior Publication Data

US 2025/0259645 A1      Aug. 14, 2025

(30) Foreign Application Priority Data

Jul. 29, 2022    (JP) ................................. 2022-122270
Jul. 29, 2022    (JP) ................................. 2022-122271
Nov. 4, 2022    (JP) ................................. 2022-177246

(51) Int. Cl.
*G11B 3/38* (2006.01)
(52) U.S. Cl.
CPC ..................................... *G11B 3/38* (2013.01)
(58) Field of Classification Search
None
See application file for complete search history.

(56) References Cited

U.S. PATENT DOCUMENTS

| | | | | |
|---|---|---|---|---|
| 3,101,952 A | * | 8/1963 | Godfrey | ................... G11B 3/20 |
| 3,235,267 A | | 2/1966 | Rangabe | |
| 4,239,239 A | * | 12/1980 | Masterson | ............... G11B 3/38 |

(Continued)

FOREIGN PATENT DOCUMENTS

| | | |
|---|---|---|
| GB | 1025844 A | 4/1966 |
| JP | S54-081704 U | 9/1979 |

(Continued)

OTHER PUBLICATIONS

Translation of RU2463675C1 (originally published Oct. 10, 2012—see IDS filed by Applicant on Jan. 18, 2025), Patent Translate ) powered by EPO and Google) (Year: 2012).*

(Continued)

*Primary Examiner* — William J Klimowicz

(74) *Attorney, Agent, or Firm* — DiPerna Law Firm, P.C.; Raymond A. DiPerna

(57) ABSTRACT

To implement stable sound playback with high sound quality, a record player for playing back sound recorded on a phonograph record includes a rotator that rotates the phonograph record, a container arranged on a side of the rotator and capable of storing one of a liquid, powder, and gel, a float to be floated on the one of the liquid, the powder, and the gel stored, in a standstill state, in the container, an arm extended from the float in a direction of the rotator, and a phono cartridge attached to the arm and including a sound playback stylus.

6 Claims, 15 Drawing Sheets

(56) References Cited

U.S. PATENT DOCUMENTS

| 4,475,184 A | * | 10/1984 | Cooper | ................. | G11B 33/08 |
| | | | | | 248/560 |
| 9,019,806 B1 | * | 4/2015 | Bowden, Sr. | ............ | G11B 3/12 |
| | | | | | 369/127 |

FOREIGN PATENT DOCUMENTS

| JP | 56-065305 A | 6/1981 |
| JP | 56-137556 A | 10/1981 |
| JP | 56-094551 A | 6/1984 |
| JP | 2008-287797 A | 11/2008 |
| RU | 2463675 C1 | 10/2012 |

OTHER PUBLICATIONS

English Translation of the Written Opinion issued on Sep. 12, 2023 in PCT/JP2023/027647.
International Search Report and Written Opinion issued on Sep. 12, 2023 in PCT/JP2023/027647, with English translation.
Japanese Office Action issued on Sep. 6, 2022 in Japanese Patent Application No. JP2022-122271, with English translation (10 pages).
Japanese Office Action issued on Feb. 14, 2023 in Japanese Patent Application No. JP2022-177246, with English translation (12 pages).
Partial Search Report for the corresponding European Patent Application No. 23846637.9 issued on Oct. 6, 2025.

* cited by examiner

RECORD PLAYER WITH ARM EXTENDED FROM FLOAT FOR PLAYING BACK HIGH-QUALITY STABLE SOUND

CROSS-REFERENCE TO RELATED APPLICATIONS

This application is a National Phase application under 35 U.S.C. 371 of International Application No. PCT/JP2023/027647 filed on Jul. 27, 2023, which application is based upon and claims the benefit of priority from Japanese Patent Application Nos. JP 2022-122270 filed on Jul. 29, 2022, JP 2022-122271 filed on Jul. 29, 2022, and JP 2022-177246 filed on Nov. 4, 2022, the disclosures of each of which are incorporated herein in their entireties by reference.

TECHNICAL FIELD

The present invention relates to a record player.

BACKGROUND ART

In the above technical field, patent literature 1 discloses a record player in which a float 6 is floated on water in one container 5 provided on one side of a phonograph record (Vinyl) 11, and a tone arm 1 is attached to the float 6 (FIG. 4).

Patent literature 2 discloses a record player in which a float 14 is floated on a fluid in one container 10 provided above a phonograph record 16, and a tone arm 26 is attached to the float (FIGS. 1 and 2).

CITATION LIST

Patent Literature

Patent literature 1: Russian Patent No. 2463675
Patent literature 2: U.S. Pat. No. 3,235,267

SUMMARY OF THE INVENTION

Technical Problem

However, in the techniques described in the above literatures, if a phonograph record having large eccentricity or warp is played back, and the stylus of a phono cartridge receives a periodical force from the phonograph record, the posture of the phono cartridge is not stabilized.

The present invention enables to provide a technique of solving the above-described problem.

Solution to Problem

One example aspect of the invention provides a record player for playing back sound recorded on a phonograph record, comprising:

a rotator that rotates the phonograph record;
a container arranged near the rotator and capable of storing one of a liquid, powder, and gel;
a float to be floated on the one of the liquid, the powder, and the gel stored in the container;
an arm extended from the float in a direction of the rotator;
a phono cartridge attached to the arm and including a sound playback stylus; and a guide mechanism that guides a force that the sound playback stylus receives from a sound groove provided in the phonograph record,
wherein the guide mechanism includes at least two contact portions provided on a side wall of the float.

Advantageous Effects of Invention

According to the present invention, it is possible to implement playback of high-quality stable sound.

BRIEF DESCRIPTION OF DRAWINGS

FIG. 15 is a view showing examples of the shape of a float according to the first to fifth example embodiments.

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

A record player 100 according to the first example embodiment of the present invention will be described with reference to FIG. 1. The record player 100 is a record player that plays back sound recorded on a phonograph record 110.

Figure 1:
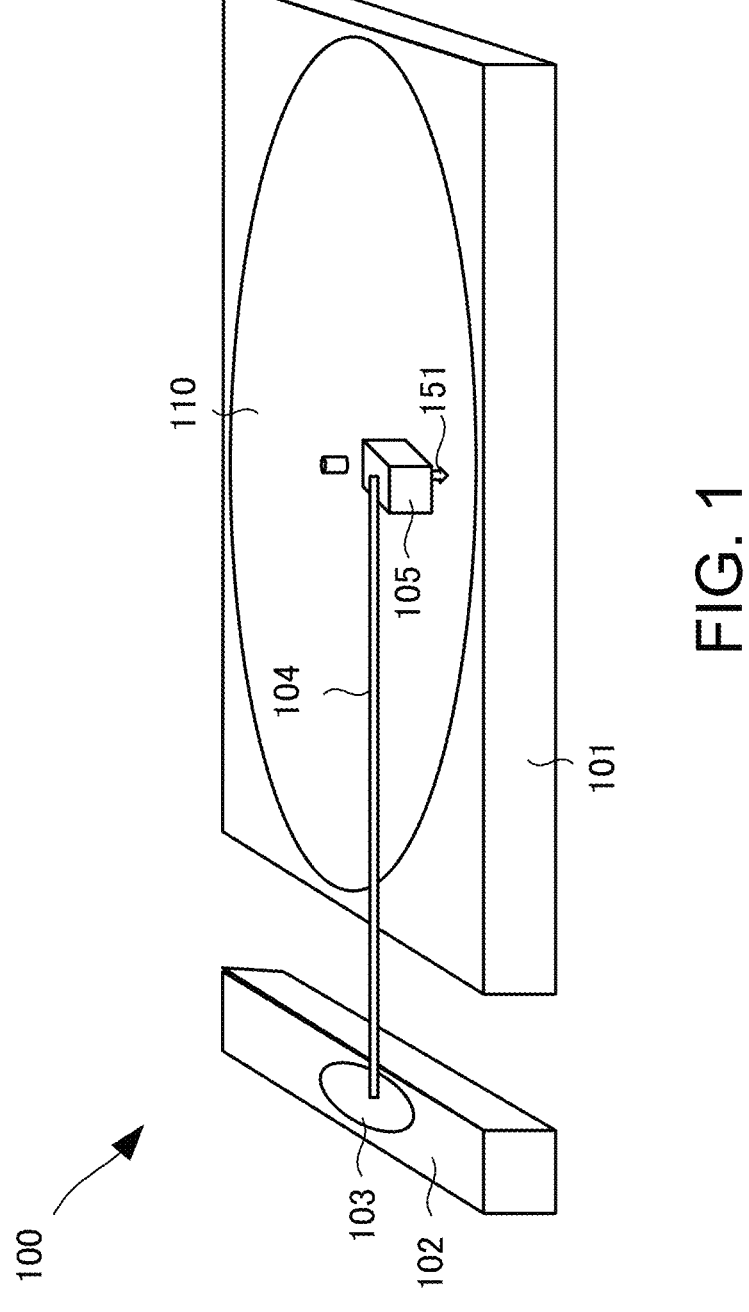
FIG. 1 is a view showing the configuration of a record player according to the first example embodiment.

As shown in FIG. 1, the record player 100 includes a rotator 101, a container 102, a float 103, an arm 104, and a phono cartridge 105.

The rotator 101 rotates the phonograph record 110.

The container 102 is arranged near the rotator 101 and can store a liquid, powder, or gel.

The float 103 is floated on the liquid, powder, or gel stored in the container 102.

The arm 104 is extended from the float 103 in the direction of the rotator 101.

The phono cartridge 105 is attached to the arm 104 and includes a sound playback stylus 151.

According to the above-described configuration, it is possible to provide a record player which has high sound quality because the phono cartridge 105 can make the stylus pressure constant without largely changing the posture even if the phonograph record 110 has eccentricity or warp.

Second Example Embodiment

Figure 2:
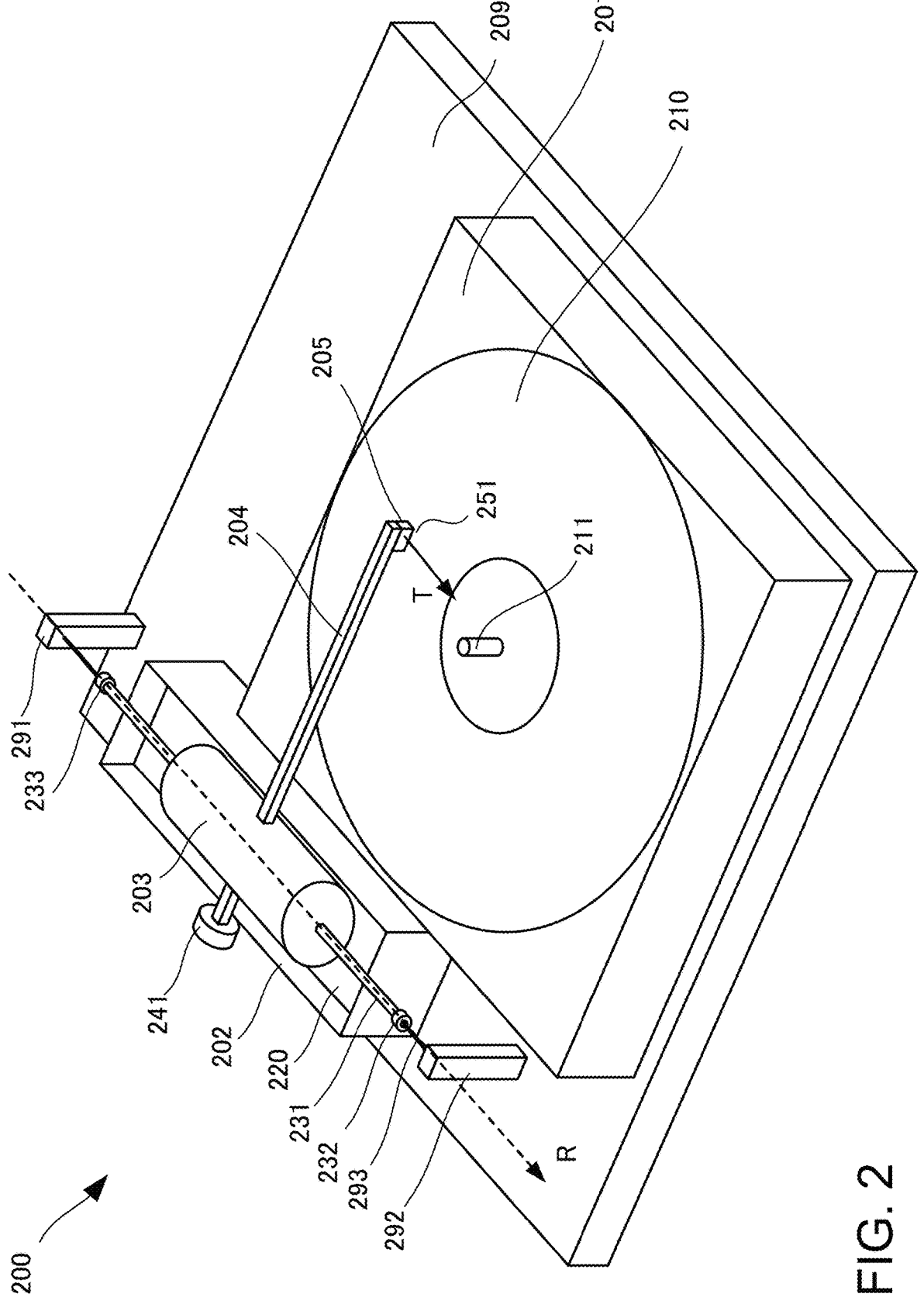
FIG. 2 is a perspective view showing the configuration of a record player according to the second example embodiment.

A record player according to the second example embodiment of the present invention will be described next with reference to FIG. 2. FIG. 2 is a perspective view for explaining the outline of a record player 200.

The record player 200 that plays back sound recorded on a phonograph record includes a rotator 201, a container 202, a float 203, an arm 204, and a phono cartridge 205.

The rotator 201 rotates a phonograph record 210.

The container 202 is arranged near the rotator 201 and can store a liquid, powder, or gel.

The float 203 is floated on the liquid, powder, or gel stored in the container 202.

The arm 204 has a rod shape and is extended from the float 203 in the direction of the rotator 201.

The phono cartridge 205 is attached to one end of the arm 204 and includes a sound playback stylus 251.

The arm 204 is made of material, such as steel, having high rigidity and vibration absorbency such that it is not deformed by a load applied to itself or a load transmitted from the stylus of the phono cartridge 205.

The rotator 201 is configured to include a so-called turn table and has a rotary driving function for rotating the phonograph record 210 clockwise. The rotator 201 includes a center spindle 211 as a rotation center shaft.

In this example embodiment, the rotator 201 has, for example, a flat plate shape having a square shape when viewed from above.

The container 202 is a rectangular parallelepiped, and is arranged along a side surface forming one side of the rotator 201.

The rotator 201 and the container 202 are fixed on a flat plate shaped base 209.

The rotator 201 functions as a turn table configured to rotate the phonograph record 210 on the base 209.

The container 202 is made of, for example, a material such as a resin, a metal, glass, or ceramic. Here, the container 202 stores a liquid 220 such as water. The float 203 is floated on a fluid such as a liquid, powder, or gel stored in the container 202. By selecting the fluid in the container 202 from substances other than water, a mass or a viscosity coefficient can be adjusted.

The float 203 is a columnar member whose cross section has, for example, a circular or elliptical shape, and can pivot. The float 203 is made of a material whose specific gravity is smaller than that of the fluid stored in the container 202, for example, foamed polystyrene or wood.

The other end of the arm 204 extends through the float 203, and a counterweight 241 is fixed to it.

The arm 204 preferably crosses the pivot axis (R-axis) of the float 203 inside the float 203. This is because if these are made to cross in this way, the gravity center of an object formed by combining the arm 204, the phono cartridge 205, and the counterweight 241 and the gravity center of an object formed by combining the float 203, a hollow shaft 231, and rings 232 and 233 can stably be made to match. For this reason, even if the angle made by an arm shaft and a horizontal plane changes when following the warp of the phonograph record, the moment of a force about an R-axis, which is applied to the floating unit, balances. More specifically, the moment around the R-axis applied to the phono cartridge side and the moment around the R-axis applied to the counterweight side balance.

As a result, the stylus pressure does not largely change, and therefore, the warp of the phonograph record does not greatly affect sound quality. For example, in a case where the stylus pressure is 0.02 N, the length of the arm is 200 mm, the warping amount of the phonograph record is 1.5 mm, and the total mass of the arm, phono cartridge, and counterweight is 150 g, the distance (deviation) between the arm shaft and the rotation axis crossing it is preferably about 4 mm or less in order to suppress the change of the stylus pressure due to the influence to 1% or less of the stylus pressure.

The counterweight 241 has a function of adjusting the stylus pressure, and has a columnar shape or the like. As the material, copper or lead having a large specific gravity is used.

The arm 204 has a long round bar or square bar shape, and the sound playback stylus 251 is arranged such that a perpendicular line down from the distal end of the sound playback stylus 251 to the rotation axis of the center spindle 211 is orthogonal to the axis of the arm 204.

A plane including the rotation axis of the center spindle 211 and the distal end of the sound playback stylus 251 is orthogonal to the axis of the arm 204.

Also, the sound playback stylus 251 is arranged such that the moving direction (R-axis direction) of the float 203 is parallel to a line that connects the sound playback stylus 251 and the center spindle 211.

The arm 204 is preferably arranged to extend through the center of the moving-direction length of the float 203. The float 203 preferably has a shape (for example, a columnar shape) symmetrical with respect to a plane passing through the center of the moving-direction length and perpendicular to the R-axis.

The float 203 can pivot about the R-axis parallel to a tracking direction T of the phono cartridge 205.

On the base 209, two columns 291 and 292 that are rectangular parallelepipeds are fixed. A rod-shaped shaft 293 is fixed in the R-axis direction between the columns 291 and 292. The position and posture of the shaft 293 are preferably adjusted to be coaxial with the R-axis.

The columns 291 and 292 and the shaft 293 are all made of a material such as steel having high rigidity. Also, the surface of the shaft 293 is preferably coated with a material such as fluororesin having a friction coefficient of 0.1 or less.

On the other hand, the hollow shaft 231 that has a cylindrical shape and is concentric to the R-axis is fixed to the float 203 while extending through the float 203. Like the arm, the hollow shaft 231 is made of a material such as steel having high rigidity.

The two rings 232 and 233 concentric to the hollow shaft 231 are fixed to the two ends of the hollow shaft 231. The rings 232 and 233 each function as a sliding portion that guides the movement of the float 203 in the axial direction. For this reason, the rings 232 and 233 are preferably made of a material such as fluororesin having a friction coefficient of 0.1 or less.

The shaft 293 is supported by the column 291 and the column 292 while being inserted into the rings 232 and 233.

Thus, a floating unit formed by the float 203 and the components (the arm 204, the counterweight 241, the phono cartridge 205, the sound playback stylus 251, the hollow shaft 231, and the rings 232 and 233) fixed thereto integrally pivots about the R-axis.

The level of the liquid 220 is adjusted to a position where no force in the vertical direction acts between the rings 232 and 233 and the shaft 293. That is, the level of the liquid 220 is adjusted to a position where the rings 232 and 233 and the shaft 293 are coaxial.

The columns 291 and 292, the shaft 293, the hollow shaft 231, and the rings 232 and 233 function as a guide mechanism that guides the float 203 such that the sound playback stylus 251 moves straightly toward the center of the phonograph record 210. The guide mechanism receives a force F2 in the circumferential speed direction, which the distal end of the sound playback stylus 251 receives from the contact to the phonograph record 210, and guides the movement of the sound playback stylus 251 moving linearly in the direction of the center spindle 211.

The phono cartridge 205 includes the sound playback stylus 251 configured to read unevenness formed in the sound groove of the phonograph record 210 and convert it into an electrical signal, and a power generation mechanism (not shown).

Many phonograph records have an eccentricity of about 2 mm at maximum due to errors in manufacturing. Since the sound playback stylus 251 can linearly be moved in the direction of the center spindle 211, as described above, it is possible to follow the eccentricity of the phonograph record 210 and suppress degradation of sound quality.

Figure 4:
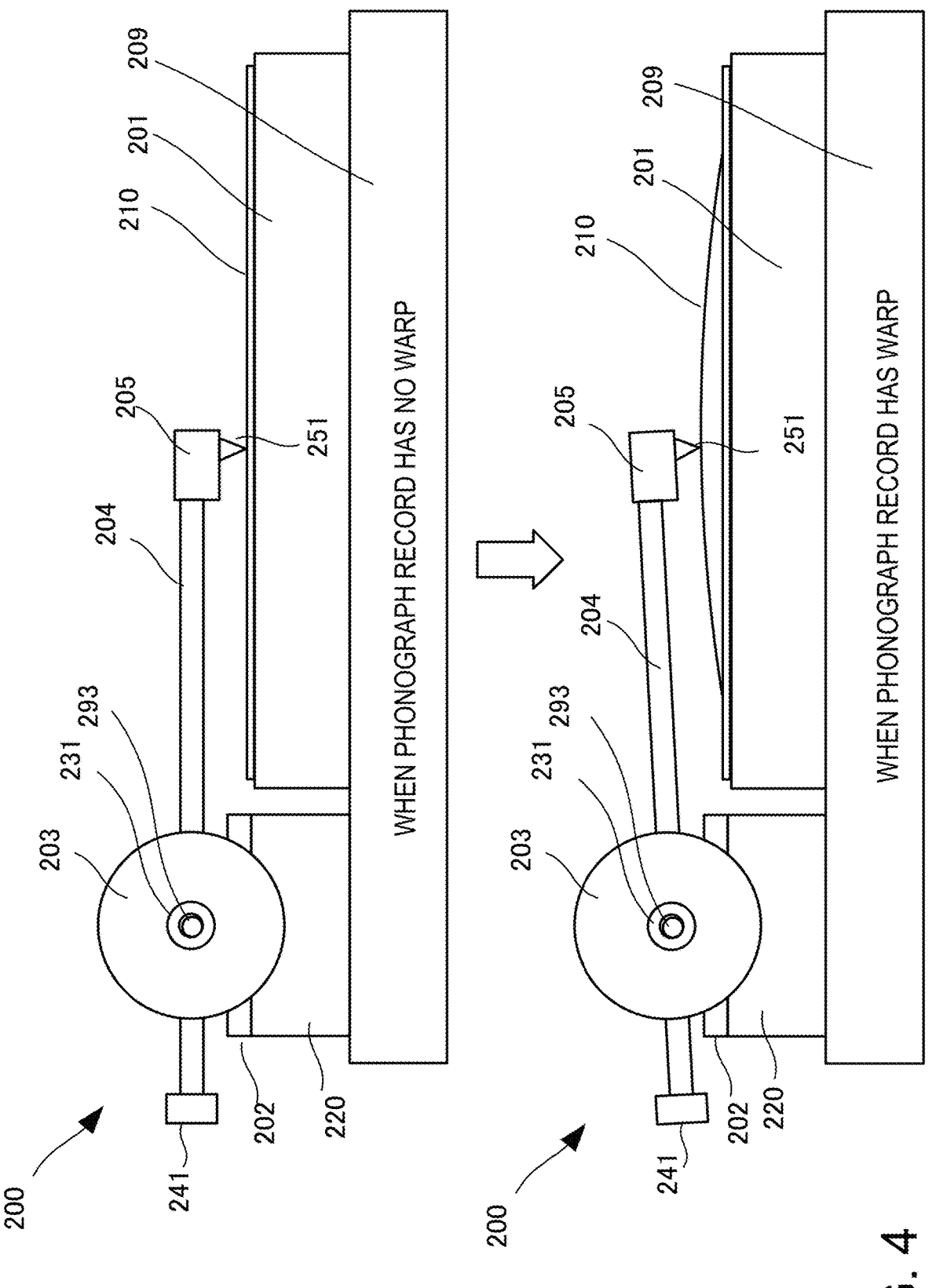
FIG. 4 is a sectional view showing the operation of the record player according to the second example embodiment.

In addition, many phonograph records have a warp of about 3 mm at maximum due to errors in manufacturing or deformation over time. In this case, along with the rotation of the warped phonograph record 210, the position of the contact between the sound playback stylus 251 and the upper surface of the phonograph record 210 in the vertical direction periodically changes. Since the pivotable float 203 supports the arm 204, the sound playback stylus 251 can follow the change of the position of the contact to the phonograph record 210 in the vertical direction (FIG. 4) while minimizing the change of the force received by the sound playback stylus 251.

In turn, the postures of the phono cartridge 205 and the sound playback stylus 251 can be stabilized. As a result, the sound playback stylus 251 can purely detect the unevenness in the sound groove of the phonograph record 210.

Since the float 203 fixed (or connected) to the arm 204 pivots while remaining floating on the liquid 220 and thus absorbs swing in the vertical direction caused by the warp of the record, any adverse effect on the sound quality can be suppressed.

The weight and position of the counterweight 241 can be adjusted such that the force (so-called stylus pressure) that the sound playback stylus 251 gives to the phonograph record 210 falls within a predetermined range (for example, 0.001 to 0.01 N).

Figure 3:
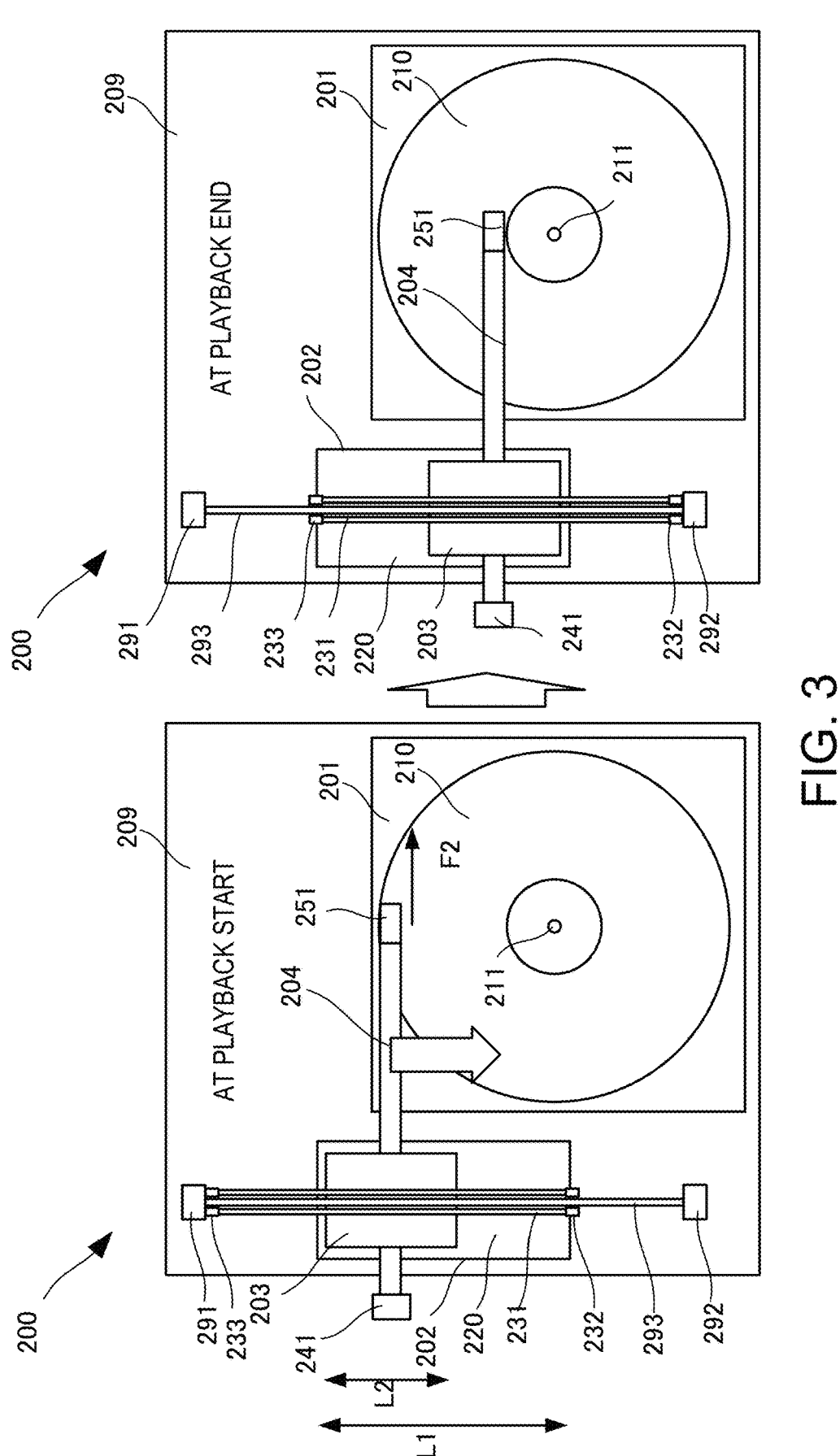
FIG. 3 is a partially transparent plan view showing the operation of the record player according to the second example embodiment.

As shown in FIG. 3, the sound playback stylus 251 moves from the outer peripheral portion of the phonograph record 210 to the center direction (the direction of the center spindle 211) while following the groove of the phonograph record 210 rotating on the rotator 201.

Along with the movement of the sound playback stylus 251, the arm 204 also moves while keeping the posture (keeping the angle made with the R-axis at a right angle).

In other words, lengths L1 and L2 of the container 202 and the float 203 are set such that the sound playback stylus 251 can move from the outermost periphery of the phonograph record 210 to the center spindle 211.

Of the weight of the floating unit, a component (99.0% to 99.9%) except the force (so-called stylus pressure) that the sound playback stylus 251 gives to the phonograph record 210 in the direction perpendicular to the record rotating surface can be supported by a buoyancy that the float 203 receives from the liquid 220. Hence, when the float 203 moves, it receives substantially small resistance from the liquid 220 and can move very smoothly.

For this reason, the sound playback stylus 251 linearly moves toward the center spindle 211 very stably due to the force in the direction of the center spindle 211, which is received from the groove of the rotating phonograph record 210.

In this example embodiment, the floating unit in which the phono cartridge 205, the arm 204, the float 203, and the counterweight 241 are integrally fixed (or connected) is supported by a buoyancy, and in this state, follows the swing in both the vertical direction and the tracking direction. Hence, even if the total weight of the floating unit is increased, the resistance to the follow-up increases only a little. For this reason, the total weight of the floating unit can be increased.

If the total weight of the structure that supports the phono cartridge 205 is increased, the posture of the phono cartridge 205 is stabilized by inertia, and the sound playback stylus 251 can faithfully convert the unevenness in the sound groove of the phonograph record 210 into a music signal.

The floating unit floats on the liquid 220 and moves in the R-axis direction due to the force that the stylus 251 receives from the groove of phonograph record 210. At this time, the floating unit receives the frictional force F2 in the circumferential speed direction of record rotation (the direction perpendicular to the R-axis) as well. The movement of the floating unit in the direction of the rotator 201 and rotation about the vertical axis are limited by the contacts between the rings 232 and 233 and the shaft 293, and the floating unit moves in the R-axis direction. That is, the floating unit functions as the linear tracking guide of the sound playback stylus 251.

At the time of rotation of the phonograph record 210, the position of the contact between the distal end of the sound playback stylus 251 and the phonograph record 210 periodically changes in the tracking direction T due to the eccentricity of the phonograph record 210. The floating unit in the floating state on the liquid follows the periodical position change while keeping posture. That is, the floating unit functions as a linear tracking guide even for the periodical position change of the sound playback stylus 251 caused by the eccentricity of the phonograph record 210.

Third Example Embodiment

Figure 5:
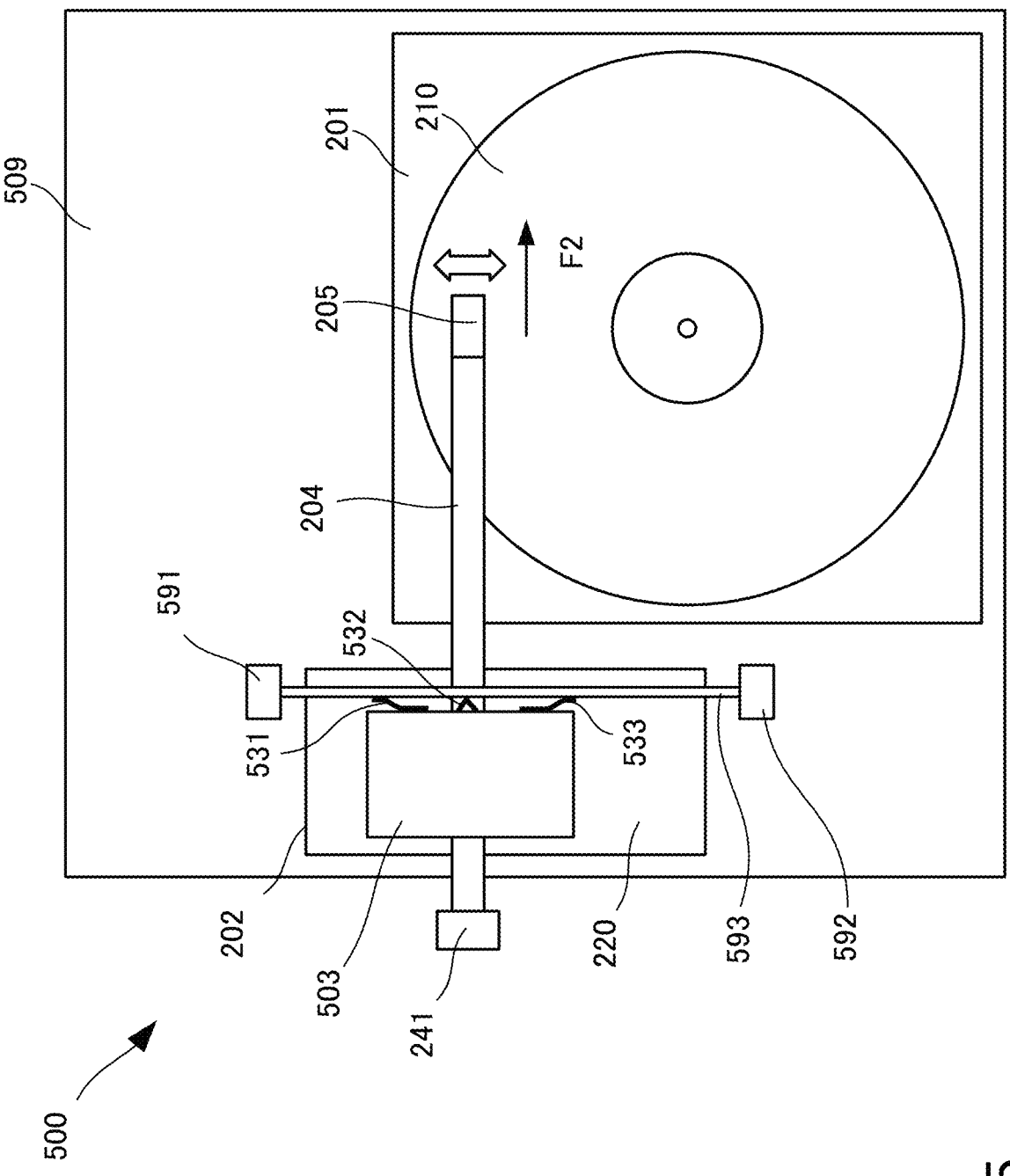
FIG. 5 is a view showing the configuration of a record player according to the third example embodiment.

A record player 500 according to the third example embodiment of the present invention will be described next with reference to FIG. 5. FIG. 5 is a view for explaining the configuration of the record player 500 according to this example embodiment. The record player 500 according to this example embodiment is different from the second example embodiment in components for regulating the movement of the float. The rest of the components and operations is the same as in the second example embodiment. Hence, the same reference numerals denote the same components and operations, and a detailed description thereof will be omitted.

Figure 6:
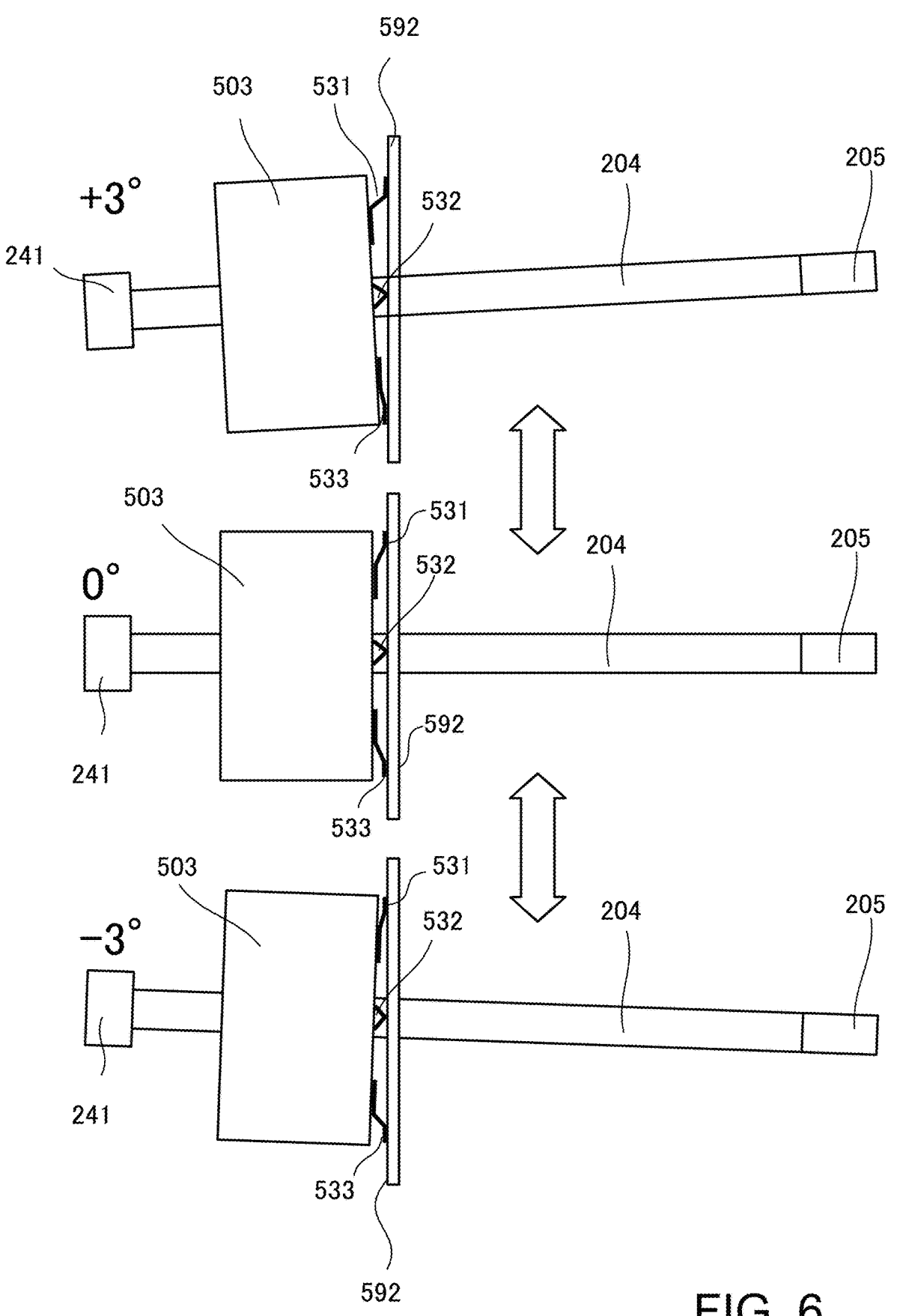
FIG. 6 is a view showing the operation of the record player according to the third example embodiment.

If the eccentricity of a phonograph record 210 is as large as 1 mm or more, the whole floating unit greatly swings along with rotation of the phonograph record 210 (FIG. 6).

To solve this problem, in place of the rings 232 and 233 according to the second example embodiment, a contact portion 532, a shaft 593 configured to be brought into contact with the contact portion 532, and members 591 and 592 configured to rigidly fix the shaft 593 to a base 509 are provided. The shaft 593 has, for example, a columnar shape.

The contact portion 532 is fixed at the center of the total length of a float 503 in the R-axis direction. The distal end of the contact portion 532 has a sharp point shape to point-contact the shaft 593.

With respect to the eccentricity of the phonograph record 210, the whole floating unit pivots about the distal end of the contact portion 532 as the center (FIG. 6). This makes it possible to release a moment given by the force that the stylus receives due to the eccentricity of the phonograph record 210 and reduce a side force (a force in the tracking direction T that a sound playback stylus 251 receives from the sound groove of the phonograph record) that adversely affects sound quality.

If the amount of eccentricity is ±1.5 mm, and the arm length is about 200 mm, the angle change is only ±0.5° or less, and the influence on sound quality is considered to be little.

Leaf springs 531 and 533 are provided on the surface of the float 503 on the side of the rotator 201 to sandwich the contact portion 532 in the R-axis direction. When the leaf springs 531 and 533 are brought into contact with the shaft 593, adjustment can be done such that the center of pivot of the floating unit about the vertical axis is set at the distal end of the contact portion 532.

If the spring constant of the leaf springs 531 and 533 is too large, the contact portion 532 separates from the shaft 593 along with swing, resulting in an adverse effect on sound quality. Hence, the spring constant of the leaf springs need to be set sufficiently small. The spring constant of the leaf springs 531 and 533 is set to a value with which the distal end of the contact portion 532 is easily moved up to a position where the distal end of the contact portion 532 contacts the shaft 593 by a force F2 applied to the distal end of the sound playback stylus 251, for example, 0.001-0.005 N/cm.

The contact portion 532, the leaf springs 531 and 533, and the shaft 593 function as a guide mechanism that guides the force that the sound playback stylus 251 receives from the sound groove provided in the phonograph record 210. That is, the guide mechanism includes at least two contact portions that are provided on the side wall of the float 203 and contact the shaft 593.

The surfaces of the contact portion 532, the leaf springs 531 and 533, and the shaft 593, which come into contact with each other, are preferably coated with a material such as fluororesin having a friction coefficient smaller than 0.1. The contact portion 532 is provided between the leaf springs 531 and 533 serving as the contact portions. The leaf springs 531 and 533 have elasticity larger (smaller elastic modulus) than the contact portion 532. The contact portion 532 is preferably made of a material having a large Young's modulus (high rigidity) such that the deformation caused by the force F2 becomes as small as possible, for example, 0.1 μm or less.

Figure 7:
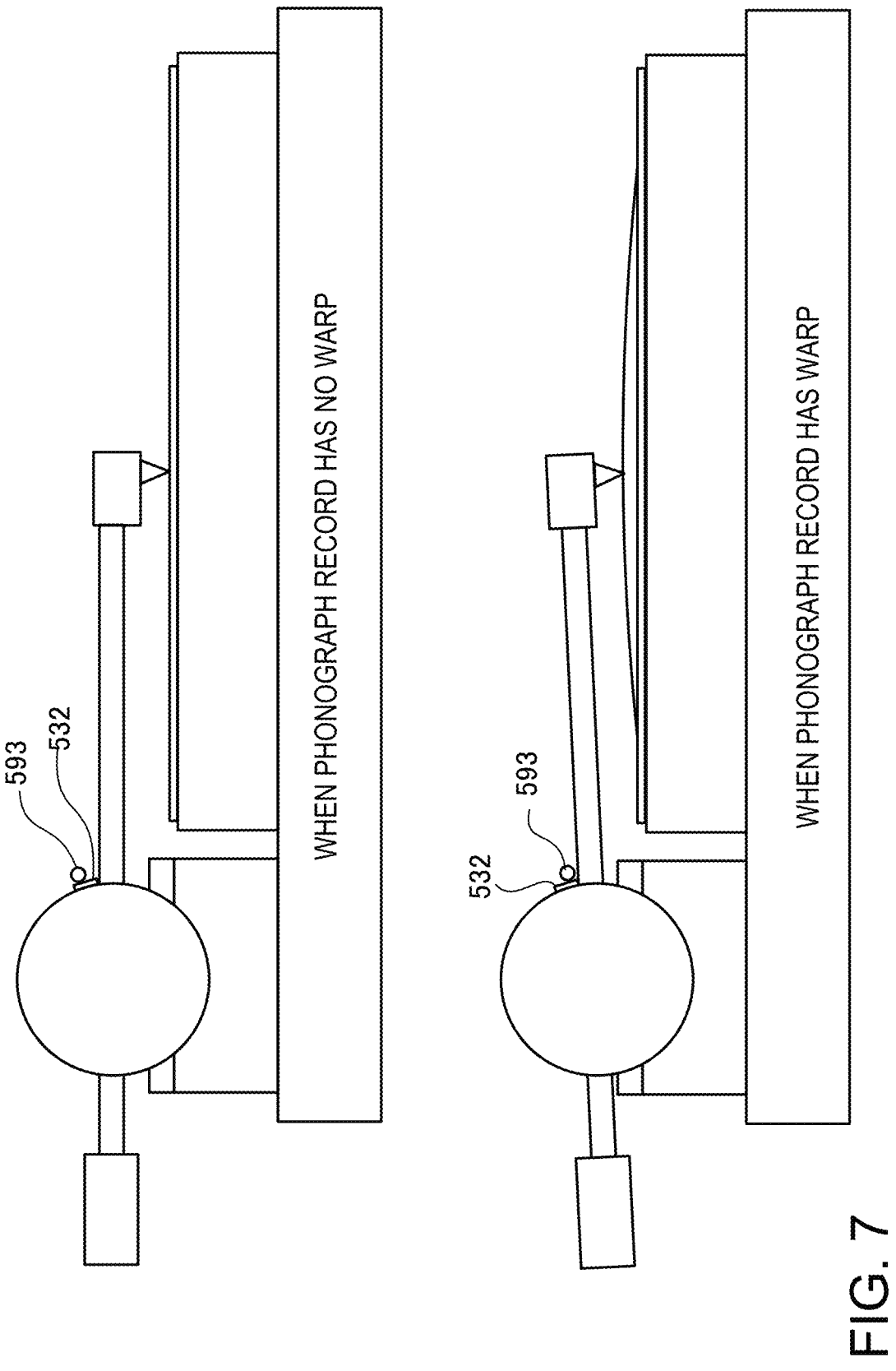
FIG. 7 is a view showing the operation of the record player according to the third example embodiment.

As shown in FIG. 7, the contact portion 532 is preferably a part of a cylindrical shape when viewed from the R-axis direction. The contact portion of the distal end of the contact portion 532 to the shaft 593 has a shape conforming to an arc with respect to the R-axis as the center such that, when the phonograph record rotates, and the float 503 periodically pivots due to the warp of the phonograph record 210, the pivot center of the float 503 is always on the R Axis.

In the above-described example embodiments, the floats 103, 203, and 503 each have a pivotable shape. An advantage will be described with reference to FIG. 8.

Figure 8:
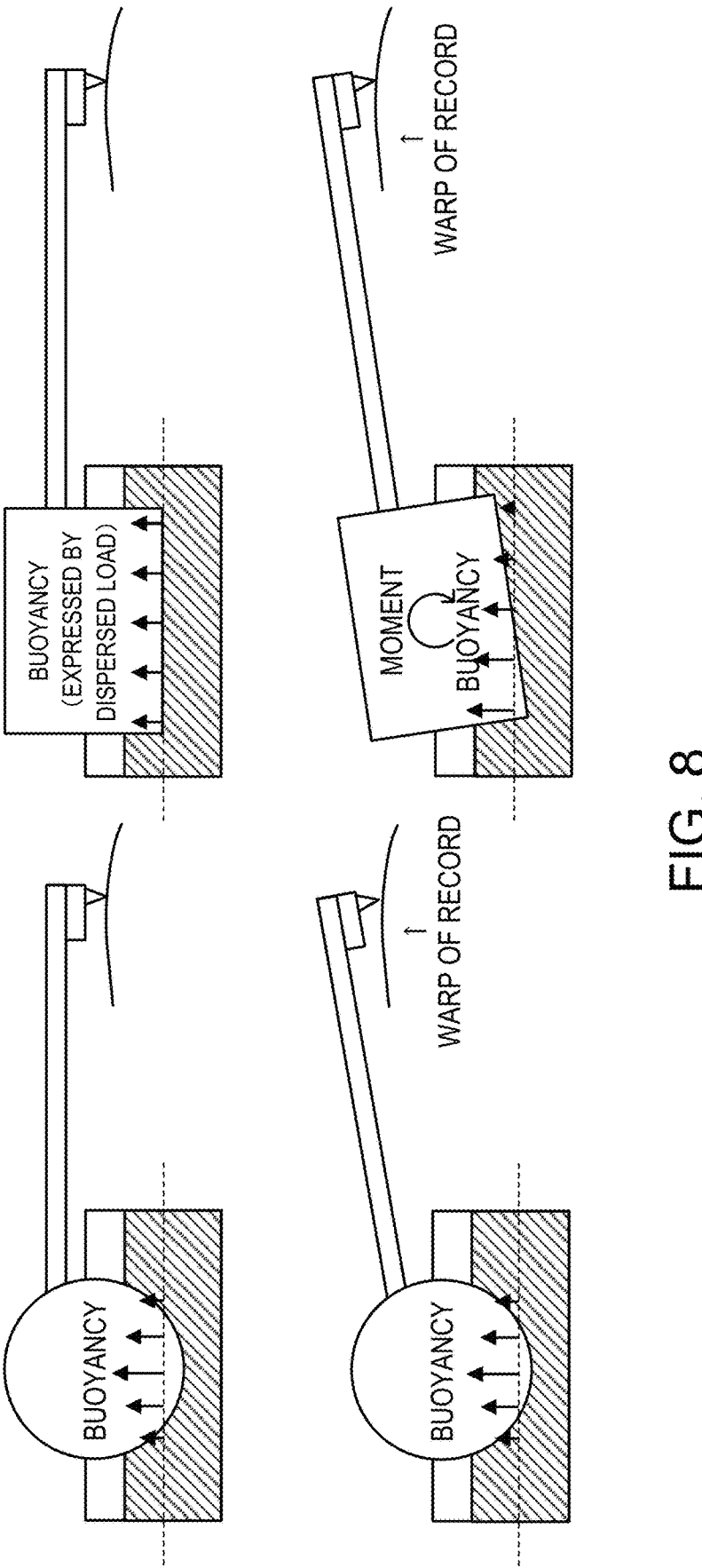
FIG. 8 is a view for explaining the advantage of the record player according to the third example embodiment.

As shown in FIG. 8, if the float has a pivotable shape such as a columnar shape, a cylindrical shape, or a conical shape, the sound playback stylus 251 can follow the phonograph record 210 with a substantially constant stylus pressure even if the phonograph record has a warp.

The float is not limited to one. A plurality of floats joined by rigid bodies may be used. If two floats apart in the R-axis direction are used, a stable arrangement can be obtained.

To adjust the vertical direction position of the sound playback stylus 251, an external tank with a pump configured to supply/discharge a fluid 220 to/from a container 202 may be installed.

Fourth Example Embodiment

A record player 900 according to the fourth example embodiment of the present invention will be described next with reference to FIGS. 9 to 12. FIGS. 9 to 12 are views for explaining the configuration of the record player 900 according to this example embodiment. The record player 900 according to this example embodiment is different from the second example embodiment in a float and components around a container. The rest of the components and operations is the same as in the second example embodiment. Hence, the same reference numerals denote the same components and operations, and a detailed description thereof will be omitted.

Figure 9:
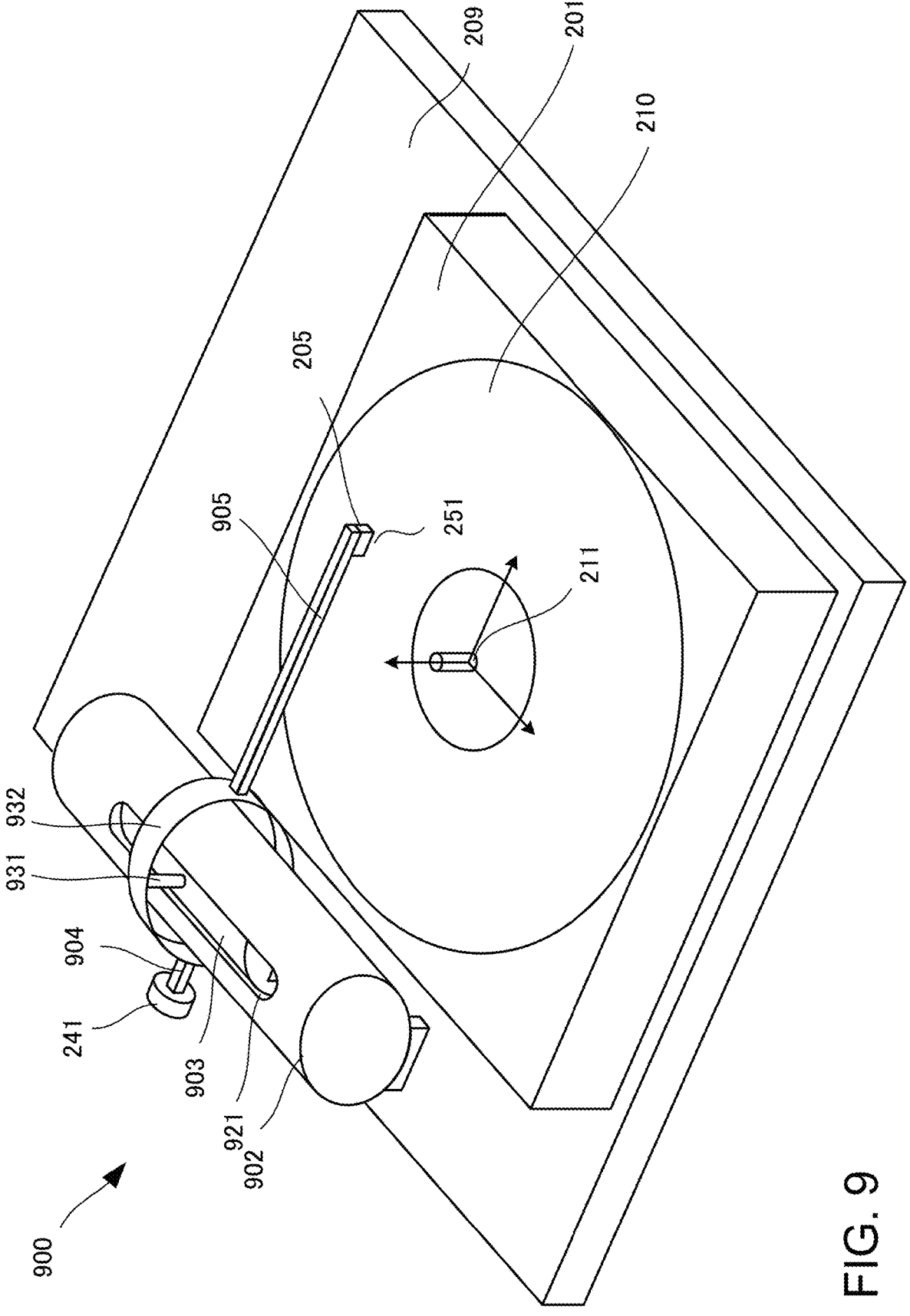
FIG. 9 is a view showing the configuration of a record player according to the fourth example embodiment.

As shown in FIG. 9, the shape of a container 902 is a cylindrical shape whose diameter is larger than that of a cylindrical float 903.

A support member 931 extending upward is fixed to the upper portion of the float 903. Also, the upper end of the support member 931 is fixed to the inner wall of a ring-shaped member 932. On the outer wall of the ring-shaped member 932, arms 904 and 905 are extended in opposite directions. A counterweight 241 is fixed to the distal end of the arm 904, and a cartridge 205 is fixed to the distal end of the arm 905.

An opening portion 921 is provided in the upper portion to the container 902 to prevent interference between the support member 931 and the container 902 if the float 903 moves. Since the opening portion 921 is provided in the upper portion of the container 902, a liquid, powder, or gel in the container 902 is hardly spilled out even if vibration/impact is applied due to an earthquake or the like or the device itself is erroneously tilted.

Figure 10:
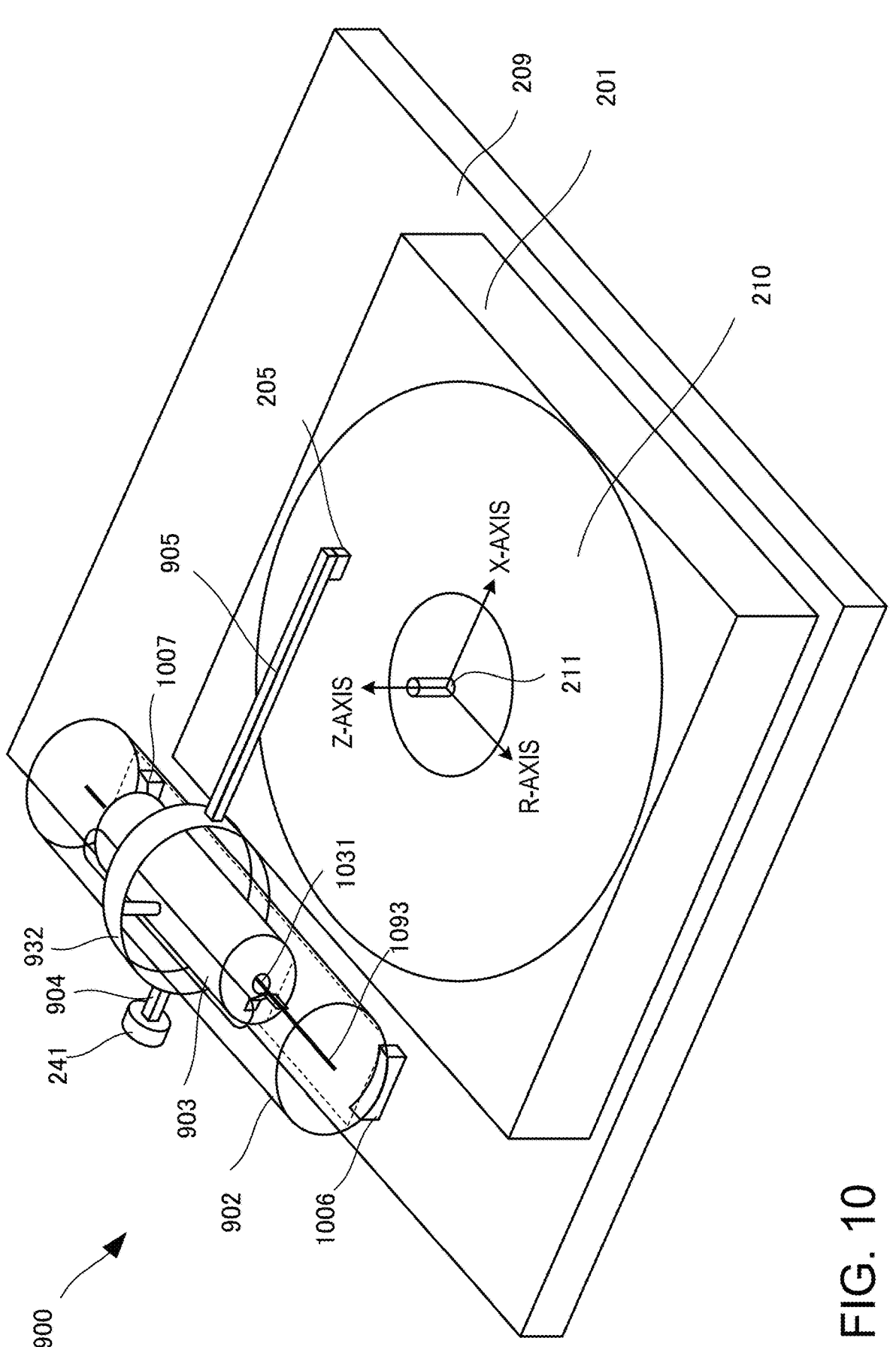
FIG. 10 is a view showing the configuration of the record player according to the fourth example embodiment.

FIG. 10 is a view of the container 902 seen through. The float 903 is provided with a through hole 1031 passing through the center axis. In the container 902, a columnar shaft 1093 is fixed at a position coaxial with the center axis when the container 902 is considered to have a cylindrical shape. A mount 1006 and a mount 1007 are installed near the two ends of the container 902 on the upper surface of a base 209 and support the container 902.

Figure 11:
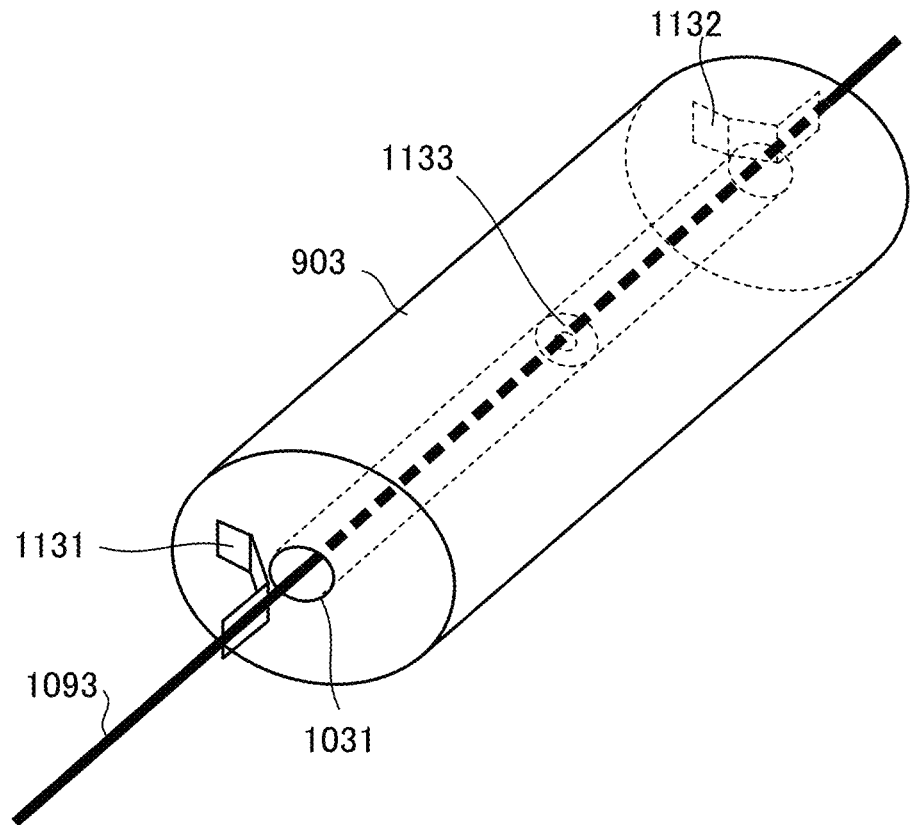
FIG. 11 is a view showing the configuration of the record player according to the fourth example embodiment.

FIG. 11 is a perspective view showing only the float 903 and elements around it. Leaf springs 1131 and 1132 are fixed to the two end faces of the float 903. A ring 1133 is fitted near the center of the through hole 1031 of the float 903 and contacts the shaft 1093.

The shaft 1093 is not in contact with the float 903. The diameter of the through hole 1031 of the float 903 is larger by several mm or larger than the diameter of the shaft 1093. Only the leaf spring 1131, the leaf spring 1132, and the ring 1133 are in contact with the shaft 1093. The leaf spring 1131, the leaf spring 1132, and the ring 1133 contact a side (the left side in FIG. 11) of the shaft 1093. The shaft 1093, the leaf springs 1131 and 1132, and the ring 1133 function as a guide mechanism that guides the float 903 such that a sound playback stylus 251 moves straight toward the center of a phonograph record 210. The mass (gravity) of the float 903 is supported not by the shaft 1093 but by a buoyancy received from a liquid 220.

Figure 12:
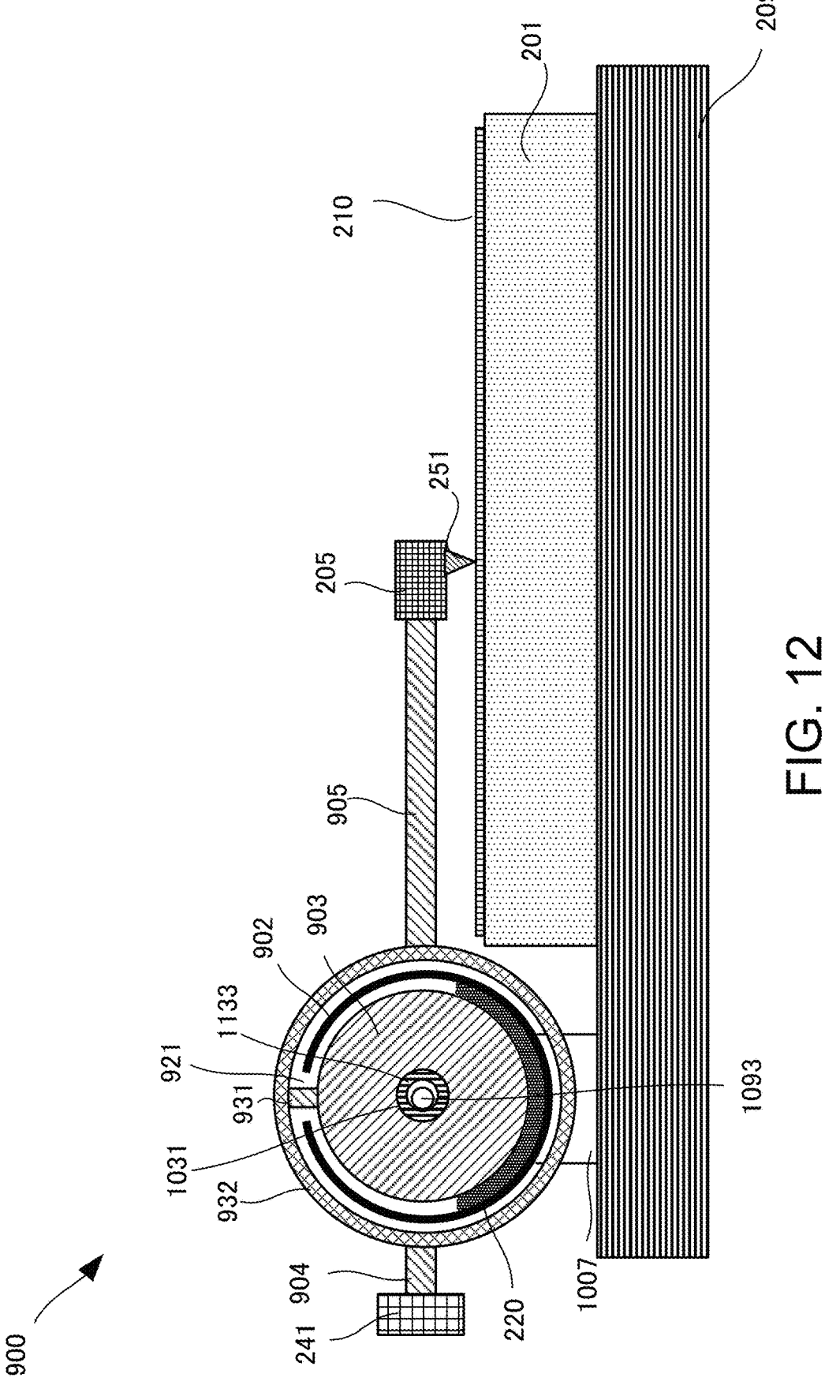
FIG. 12 is a view showing the configuration of the record player according to the fourth example embodiment.

FIG. 12 is a sectional view passing through the center axis of the arm 905 and a vertical line. If a lid is provided on the opening portion 921 of the container 902, the liquid can be made more difficult to spill. The lid may be closed only in an nonuse state. Alternatively, the lid may automatically be closed when the container 902 vibrates or tilts.

Figure 13:
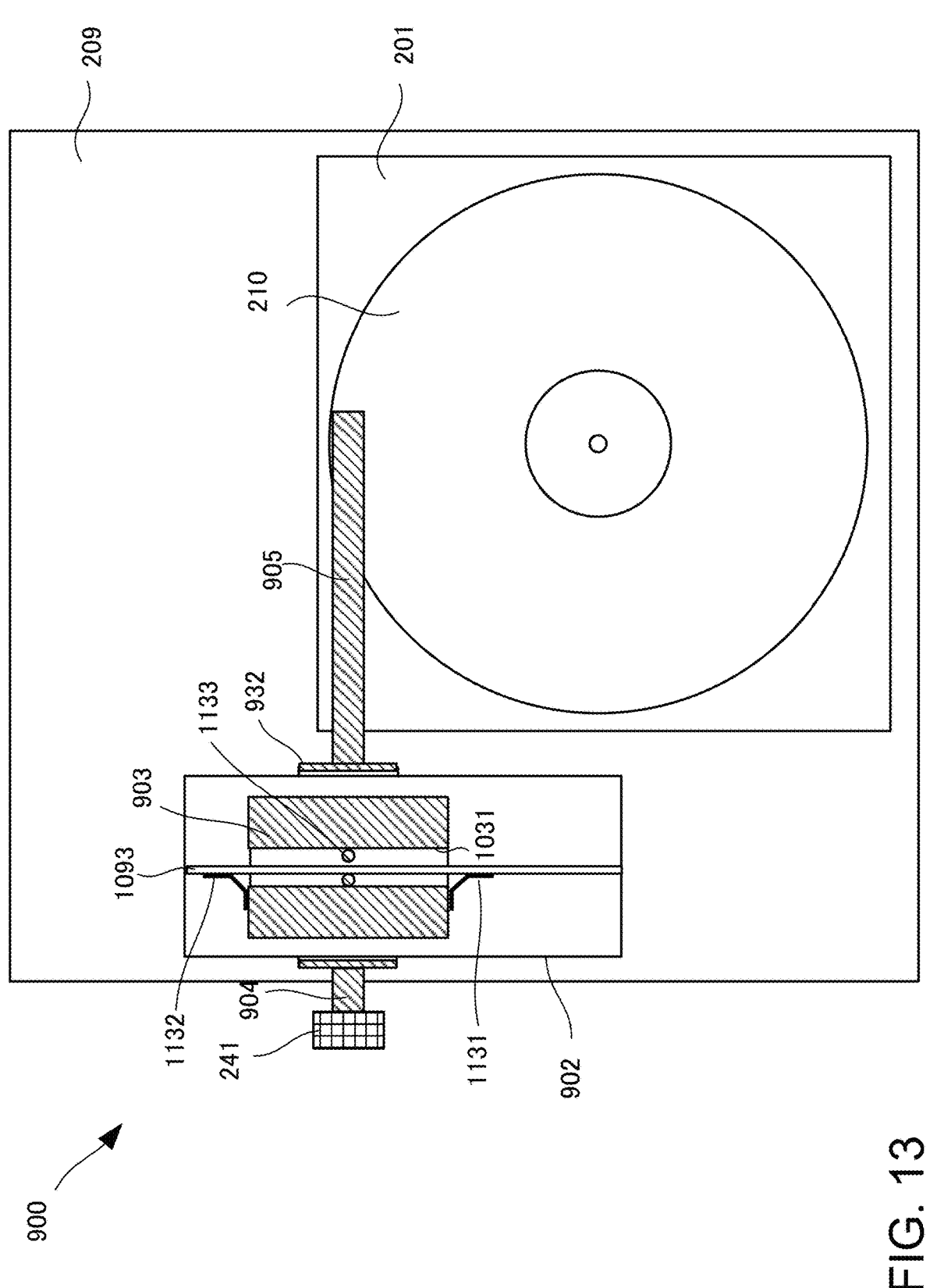
FIG. 13 is a view showing the configuration of the record player according to the fourth example embodiment.

FIG. 13 is a sectional view taken along a horizontal plane passing through the center axis of the arm 905. The ring 1133 is fixed to the inner wall of the through hole 1031. The shaft 1093 and the ring 1133 function as a guide mechanism by sliding in the tracking direction (R-axis direction) while abutting in the direction of the distal end of the arm 905 (in the rightward direction in FIG. 13).

Each of the leaf springs 1131 and 1132 is a member formed by bending a thin plate made of an elastic material such as aluminum or resin and having a thickness of, for example, 0.1 mm, and is fixed to the side wall of the float by an adhesive or the like.

The leaf springs 1131 and 1132 are deflected, thereby absorbing (turning aside) swing of the float 903 in the tracking direction which is caused by fine eccentricity of a record groove. At this time as well, since the shaft 1093 and the ring 1133 slide while keeping contact, a music signal is not disturbed by an unnecessary position change (displacement) in the arm shaft direction.

Fifth Example Embodiment

Figure 14:
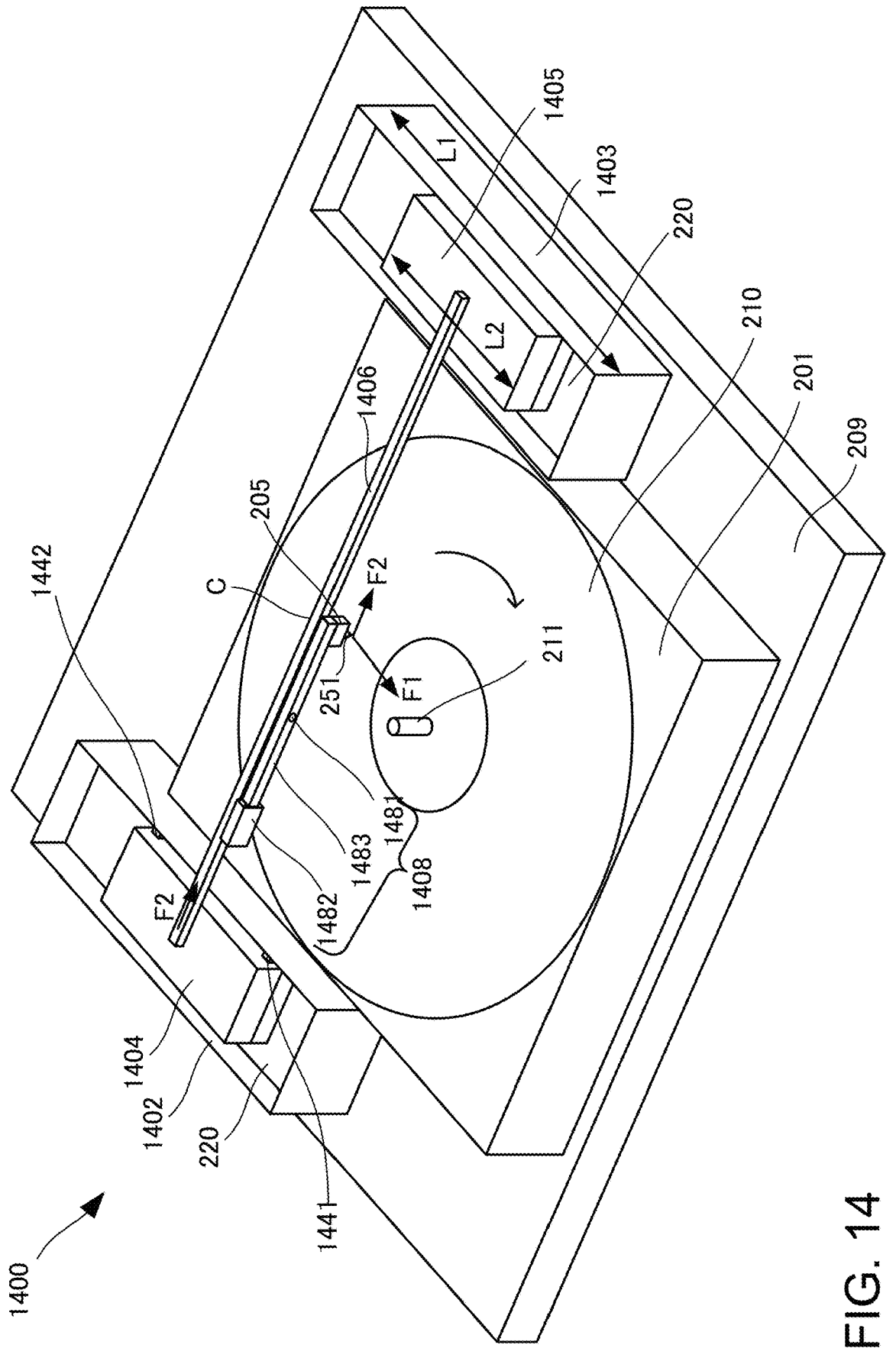
FIG. 14 is a view showing the configuration of a record player according to the fifth example embodiment.

A record player 1400 according to the fifth example embodiment of the present invention will be described next with reference to FIG. 14. FIG. 14 is a view for explaining the configuration of the record player 1400 according to this example embodiment. The record player 1400 according to this example embodiment is different from the second example embodiment in that two floats are provided in two containers. The rest of the components and operations is the same as in the second example embodiment. Hence, the same reference numerals denote the same components and operations, and a detailed description thereof will be omitted.

The record player 1400 that plays back sound recorded on a phonograph record 210 includes a rotator 201, two containers 1402 and 1403, two floats 1404 and 1405, a beam 1406, and a phono cartridge 205.

The containers 1402 and 1403 are arranged to sandwich the rotator 201 and can store a liquid, powder, or gel. The rotator 201 and the containers 1402 and 1403 are fixed to a table 209.

The containers 1402 and 1403 are rectangular parallelepipeds and are made of a material not passing a liquid, for example, a resin, a metal, glass, or ceramic. Here, the containers 1402 and 1403 store a liquid 220 such as water. The two floats 1404 and 1405 are floated on a fluid such as a liquid, powder, or gel stored in the two containers 1402 and 1403, respectively. By selecting the fluid from substances other than water, a mass or a viscosity coefficient can be adjusted.

Here, the floats 1404 and 1405 each have a rectangular parallelepiped shape. However, the present invention is not limited to this, and these can have any long shape that smoothly moves in the containers 1402 and 1403. The float may be a columnar member whose cross section has, for example, a circular or elliptical shape. The floats 1404 and 1405 are made of a material whose specific gravity is smaller than that of the fluid stored in the containers 1402 and 1403, for example, foamed polystyrene or wood.

The beam 1406 has two ends fixed to the two floats 1404 and 1405, and connect the two floats 1404 and 1405. The beam 1406 has a long round bar or square bar shape, and a line that connects a center C of the beam 1406 and a center spindle 211 is orthogonal to the axis of the beam 1406. Also, the moving directions of the floats 1404 and 1405 are parallel to the line that connects the center C of the beam 1406 and the center spindle 211.

In FIG. 14, the two ends of the beam 1406 are fixed to the upper surfaces of the two floats 1404 and 1405. However, the present invention is not limited to this. The two ends may be fixed to the side surfaces of the two floats 1404 and 1405 on the side of the rotator 201. The two ends of the beam 1406 are preferably arranged at the center of the moving direction length of the floats 1404 and 1405.

A suspension mechanism 1408 that suspends the phono cartridge 205 and follows the vertical movement of a sound playback stylus 251 is attached to the beam 1406. The phono cartridge 205 includes the sound playback stylus 251 configured to read unevenness formed in the sound groove of the phonograph record 210 and convert it into an electrical signal, and a power generation mechanism (not shown).

The suspension mechanism 1408 is a so-called tone arm, connects the beam 1406 and the phono cartridge 205 and includes a pin 1481, a counterweight 1482, and an arm 1483. The pin 1481 is fixed to a position apart from the center C of the beam 1406. The arm 1483 can pivot about the pin 1481. The phono cartridge 205 is fixed to one end of the arm 1483, and the counterweight 1482 is fixed to the other end. The weight of the counterweight 1482 and the positions of pin 1481 and the counterweight 1482 on the arm 1483 can be adjusted such that a force (so-called stylus pressure) that the sound playback stylus 251 gives to the phonograph record 210 in the direction perpendicular to the record rotating surface falls within a predetermined range (for example, 0.001 to 0.01 N).

The material of the beam 1406 and the arm 1483 is steel having high rigidity, and this can reduce deformation due to a force received by the sound playback stylus 251.

As for the sound playback stylus 251, the phono cartridge 205 is preferably attached to exist on a plane that includes a line connecting the center C and the center of the center spindle 211 and is perpendicular to the upper surface of the rotator 201.

The sound playback stylus 251 moves from the outer peripheral portion of the phonograph record 210 to the center direction (the direction of the center spindle 211) following the groove of the phonograph record 210 rotating on the rotator 201. Along with the movement of the stylus 251, the beam 1406 also moves toward the center of rotation of the center spindle 211 while keeping the posture. At this time, the two floats 1404 and 1405 move while remaining floating in the containers 1402 and 1403.

Lengths L1 and L2 of the containers 1402 and 1403 and the floats 1404 and 1405 are set such that the sound playback stylus 251 can move from the outermost periphery of the phonograph record 210 to the center spindle 211. The container 1402 and 1403, or the float 1404 and the float 1405 preferably have the same size and same shape.

The floats 1404 and 1405, the beam 1406, the phono cartridge 205, and the suspension mechanism 1408 integrally move as a whole, and the whole will be referred to as a floating unit here. The floats 1404 and 1405, beam 1406, the phono cartridge 205, and the suspension mechanism 1408 are preferably configured such that the gravity center of the whole floating unit is located at the distal end of the sound playback stylus 251. This is because if the distal end of the sound playback stylus 251 can be made to match the gravity center of the whole floating unit, the moment of a force that rotates the floating unit about the stylus is never generated even by forces in all directions that the sound playback stylus 251 receives from the phonograph record 210. Note that to make the distal end of the sound playback stylus 251 match the gravity center of the whole floating unit, it is also effective to paste a weight for adjusting the gravity center to a part of the beam 1406.

Of the weight of the floating unit, a component (about 99.8%) except the force (so-called stylus pressure) that the sound playback stylus 251 gives to the phonograph record 210 in the direction perpendicular to the record rotating surface can be supported by a buoyancy that the floats 1404 and 1405 receive from the fluid 220. Hence, when the floats 1404 and 1405 move, these receive only a small resistance from the fluid and can move very smoothly. For this reason, the sound playback stylus 251 can linearly move toward the center spindle 211 very stably due to a force F1 in the direction of the center spindle 211, which is received from the groove of the rotating phonograph record 210.

The sound playback stylus 251 also receives a force F2 in the circumferential direction of the phonograph record 210 from the groove of the rotating phonograph record 210. The magnitude of the force F2 is about 0.005 to 0.05 N, although it changes depending on the state of the record or the shape of the stylus.

According to this example embodiment, the two floats 1404 and 1405 move in the substantially same direction at the substantially same speed, and thus, the sound playback stylus 251 at the center performs linear tracking.

Upon receiving the force F2, the floating unit moves in the direction of the force F2. However, stoppers 1441 and 1442 provided on the float 1404 abut against the inner wall of the container 1402 on the phonograph record side, thereby stopping the movement by the force F2.

The position (height) of the stoppers 1441 and 1442 in the vertical direction is preferably the same as the position (the distal end of the stylus) at which the sound playback stylus 251 receives the force from the phonograph record. The stoppers 1441 and 1442 may be rotatable rollers.

An example of the material of the stoppers 1441 and 1442 is a material such as aluminum that has such a rigidity that prevents these from causing deformation of 0.001 mm or more by the force F2.

The stoppers 1441 and 1442 are, for example, cubes whose sides each have a length of about 2 mm. Since the stoppers 1441 and 1442 serve as slide guides that guide the movement in the direction of the float 1404, a material such as fluororesin having a small friction coefficient (a friction coefficient of 0.1 or less, and about 0.05 to 0.1 in general fluororesin) is used at least for the surfaces.

Note that the inner wall surface of the container 1402 that the stoppers 1441 and 1442 contact is preferably coated with a material such as fluororesin having a small friction coefficient (a friction coefficient of 0.1 or less). In addition, the slide guide is not limited to the form of the stoppers 1441 and 1442 and may be a roller, a magnetic member, or a noncontact guide using air or a fluid.

Note that due to a very small frictional force generated between the stoppers 1441 and 1442 and the inner wall of the container 1402, in the floating unit, a moment M of a very small force is generated about an axis perpendicular to the rotating surface of the record, but this moment can be received by the stoppers 1441 and 1442. This makes it possible to linearly move the sound playback stylus 251 toward the center spindle 211 (so-called linear tracking) in a stable posture without rotation.

Many phonograph records have an eccentricity of about 2 mm at maximum due to errors in manufacturing. Since the sound playback stylus 251 can linearly be moved in the direction of the center spindle 211, as described above, it is possible to follow the eccentricity of the phonograph record and suppress degradation of sound quality.

In addition, many phonograph records have a warp of about 3 mm at maximum due to errors in manufacturing or deformation over time. In this case, along with the rotation of the warped phonograph record 210, the force that the phono cartridge 205 receives from the upper surface of the phonograph record 210 periodically changes. Since the suspension mechanism 1408 as described above is provided, the sound playback stylus 251 can follow the upper surface position of the phonograph record 210 while minimizing the change of the force.

By the operations of the above-described floating unit and the suspension mechanism 1408, the postures of the phono cartridge 205 and the sound playback stylus 251 can be stabilized. As a result, the sound playback stylus 251 can purely detect only the unevenness in the sound groove of the phonograph record 210.

Note that the vertical direction positions of the floats 1404 and 1405 preferably match, and to do this, a tubular member that connects the containers 1402 and 1403 and distributes the liquid 220 may further be provided. Note that to avoid damage to peripheral devices caused by spill-out of the fluid 220, a water absorbing material such as diatomite may be spread outside the containers 1402 and 1403. To adjust the position of the cartridge, an external tank with a pump configured to supply or suck the fluid 220 may be installed.

Other Example Embodiments

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

Figure 15:
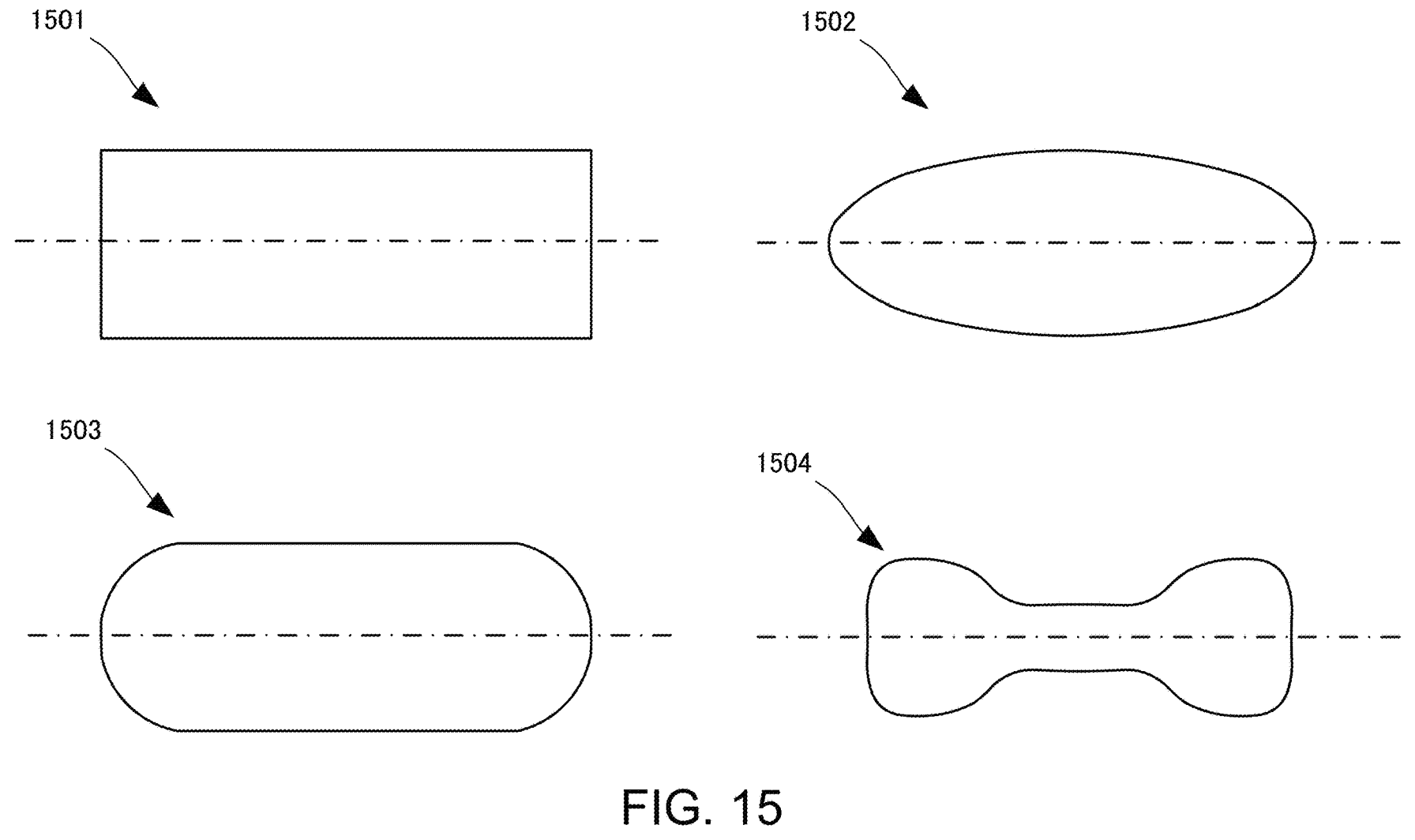

For example, the float may have a rectangular parallelepiped shape. If the float has a rotating body shape, it can be selected from cross sectional shapes 1501 to 1504 passing through the rotation axis as shown in FIG. 15. The cross sectional shape is not limited to those shown in FIG. 15, and a rectangular shape, a rectangular shape with round corners, an elliptical shape, or a shape drawn by various free curves can be used.

This application is based upon and claims the benefit of priority from Japanese patent application No. 2022-122270, filed on Jul. 29, 2022, Japanese patent application No. 2022-122271, filed on Jul. 29, 2022, and Japanese patent application No. 2022-177246, filed on Nov. 4, 2022, the disclosure of which is incorporated herein in its entirety by reference.

The invention claimed is:

1. A record player, comprising:
a rotator configured to rotate a phonograph record placed in a horizontal plane on a top of said rotator;
at least one container arranged on a side of said rotator and capable of storing one of a liquid, powder, and gel;
at least one float to be floated on the one of the liquid, the powder, and the gel stored, in a standstill state, in said container;
an arm extended from said float in a direction of said rotator; and
a phono cartridge attached to said arm and including a sound playback stylus, wherein said arm is extended substantially horizontally from said float to said phono cartridge, and
wherein said float has a shape pivotable about a horizontal axis parallel to a tracking direction of said phono cartridge, the tracking direction being a direction from said sound playback stylus to a center of said rotator.

2. The record player according to claim 1, wherein said float has a rotating body shape.

3. A record player, comprising:
a rotator configured to rotate a phonograph record placed in a horizontal plane on a top of said rotator;
at least one container arranged on a side of said rotator and capable of storing one of a liquid, powder, and gel;
at least one float to be floated on the one of the liquid, the powder, and the gel stored, in a standstill state, in said container;
an arm extended from said float in a direction of said rotator;

a phono cartridge attached to said arm and including a sound playback stylus, wherein said arm is extended substantially horizontally from said float to said phono cartridge; and
a guide mechanism that guides said float such that said sound playback stylus moves straight toward a center of the phonograph record,
wherein said guide mechanism includes
a rod-shaped shaft extending through said float, which is parallel to a tracking direction of said phono cartridge.

4. The record player according to claim 3, wherein said guide mechanism further includes
one or more rings that contact said shaft.

5. A record player, comprising:
a rotator configured to rotate a phonograph record placed in a horizontal plane on a top of said rotator;
at least one container arranged on a side of said rotator and capable of storing one of a liquid, powder, and gel;
at least one float to be floated on the one of the liquid, the powder, and the gel stored, in a standstill state, in said container;
an arm extended from said float in a direction of said rotator; and
a phono cartridge attached to said arm and including a sound playback stylus, wherein said arm is extended substantially horizontally from said float to said phono cartridge,
wherein
said at least one container comprises two containers,
said at least one float comprises two floats each of which is floated on one of liquid, powders, and gel stored in each of said two containers, and
said arm is a beam that connects said two floats.

6. The record player according to claim 5, further comprising a suspension mechanism that is attached to said arm, suspends said phono cartridge, and follows vertical movement of said sound playback stylus.

* * * * *